(12) United States Patent
Zhang et al.

(10) Patent No.: US 11,430,252 B2
(45) Date of Patent: Aug. 30, 2022

(54) ELECTRONIC DEVICE AND OPTICAL FINGERPRINT RECOGNITION MODULE THEREOF

(71) Applicant: WUHAN CHINA STAR OPTOELECTRONICS TECHNOLOGY CO., LTD., Wuhan (CN)

(72) Inventors: Guiyang Zhang, Wuhan (CN); Guowei Zha, Wuhan (CN)

(*) Notice: Subject to any disclaimer, the term of this patent is extended or adjusted under 35 U.S.C. 154(b) by 205 days.

(21) Appl. No.: 16/956,593

(22) PCT Filed: Apr. 17, 2020

(86) PCT No.: PCT/CN2020/085269
§ 371 (c)(1),
(2) Date: Jun. 21, 2020

(87) PCT Pub. No.: WO2021/203456
PCT Pub. Date: Oct. 14, 2021

(65) Prior Publication Data
US 2022/0139103 A1    May 5, 2022

(30) Foreign Application Priority Data
Apr. 7, 2020   (CN) .......................... 202010265115.9

(51) Int. Cl.
*G06V 40/13*    (2022.01)
*G02B 5/18*     (2006.01)

(52) U.S. Cl.
CPC ....... *G06V 40/1318* (2022.01); *G02B 5/1819* (2013.01)

(58) Field of Classification Search
None
See application file for complete search history.

(56) References Cited

U.S. PATENT DOCUMENTS

| | | | | |
|---|---|---|---|---|
| 2017/0299794 | A1* | 10/2017 | Fattal | G02B 6/0016 |
| 2017/0323144 | A1* | 11/2017 | Wu | B32B 7/12 |
| 2019/0065813 | A1* | 2/2019 | Xu | G02B 6/10 |
| 2021/0141274 | A1* | 5/2021 | Wei | G02B 6/0038 |
| 2021/0271003 | A1* | 9/2021 | Yang | G06V 40/12 |
| 2021/0365659 | A1* | 11/2021 | Yang | G06V 10/147 |

FOREIGN PATENT DOCUMENTS

| | | |
|---|---|---|
| CN | 208673353 U | 3/2019 |
| CN | 109948410 A | 6/2019 |
| CN | 110770745 A | 2/2020 |
| CN | 110929585 A | 3/2020 |
| CN | 111461040 A | 7/2020 |
| KR | 20180085227 A | 7/2018 |

\* cited by examiner

*Primary Examiner* — Joseph R Haley

(57) ABSTRACT

An electronic device and an optical fingerprint recognition module thereof are provided. The optical fingerprint recognition module includes: an optical component, wherein the optical component includes a substrate and a grating dielectric layer disposed on the substrate, and the grating dielectric layer includes a plurality of repeating grating units arranged in an array manner; and a fingerprint sensor, wherein the fingerprint sensor is configured to receive a light signal transmitted from the optical component, and is configured to convert the light signal into an electrical signal.

16 Claims, 6 Drawing Sheets

ELECTRONIC DEVICE AND OPTICAL FINGERPRINT RECOGNITION MODULE THEREOF

FIELD

The present disclosure relates to the field of display technologies, and more particularly, relates to an electronic device and an optical fingerprint recognition module thereof.

BACKGROUND

With developments of optical technologies and semiconductor technologies, electronic devices, represented by liquid crystal displays (LCDs) and organic light-emitting diodes (OLEDs), have dominated the display field due to advantages such as light and thin body, low power consumption, zero radiation, excellent color purity, and high contrast.

A capacitive fingerprint recognition method is applied to conventional electronic devices, which have an out-cell capacitive fingerprint recognition module disposed at a home bottom. When a finger presses a cover glass, a fingerprint signal can be identified according to different electrical signals generated based on peaks and valleys of a fingerprint. The capacitive fingerprint recognition has advantages of fast response times and low cost. However, the capacitive fingerprint recognition module is not transparent. Therefore, a portion of a display area may be sacrificed. Due to a wave of full-screen display over the past two years, a full-screen fingerprint recognition technology with display function becomes increasingly popular.

Currently, a fingerprint recognition technology, which identifies a fingerprint by light emitted from a screen and reflected by a finger without affecting a display effect, has attracted increasing attention. As shown in FIG. 1, an optical fingerprint module is mainly composed of an optical path structure 3a, a light-sensitive sensor 2a, a driver chip 1a, and an encapsulation layer 4a, which are encapsulated under an organic light-emitting diode (OLED) driving substrate 5a by an out-cell manner. However, a thickness of such optical fingerprint module is relatively greater, resulting in larger electronic devices.

Therefore, it is necessary to provide a new technical solution to address the above technical issue.

SUMMARY

An embodiment of the present disclosure provides an electronic device and an optical fingerprint recognition module to reduce a thickness of electronic devices.

The present disclosure provides an optical fingerprint recognition module, including:

an optical component, wherein the optical component includes a substrate and a grating dielectric layer disposed on the substrate, and the grating dielectric layer includes a plurality of repeating grating units arranged in an array manner; and a fingerprint sensor, wherein the fingerprint sensor is configured to receive an optical signal transmitted from the optical component, and is configured to convert the optical signal into an electrical signal.

In the optical fingerprint recognition module provided by the present disclosure, the repeating grating units include a first sub-grating unit disposed at a center and a plurality of second sub-grating units surrounding the first sub-grating unit, an interval between centers of two adjacent first sub-grating units arranged along a first direction is equal to an interval between centers of two adjacent first sub-grating units arranged along a second direction.

In the optical fingerprint recognition module provided by the present disclosure, the repeating grating units have a symmetrical shape.

In the optical fingerprint recognition module provided by the present disclosure, the optical component further includes at least one of a buffer layer or an optically functional film layer.

In the optical fingerprint recognition module provided by the present disclosure, the optically functional film layer is made of at least two different inorganic materials in a stacked manner.

In the optical fingerprint recognition module provided by the present disclosure, the optically functional film layer further includes a grating metal layer disposed on the grating dielectric layer.

In the optical fingerprint recognition module provided by the present disclosure, the fingerprint sensor includes a first surface and a second surface, and the optical component is attached to the second surface or is disposed inside the fingerprint sensor.

In the optical fingerprint recognition module provided by the present disclosure, the optical component is attached to the second surface by an adhesive layer.

In the optical fingerprint recognition module provided by the present disclosure, a thickness of the optical component is less than 5 μm.

The present disclosure further provides an electronic device, including an optical fingerprint recognition module and a display panel, wherein the optical fingerprint recognition module is disposed on the display panel or is integrated in the display panel and includes:

an optical component, wherein the optical component includes a substrate and a grating dielectric layer disposed on the substrate, and the grating dielectric layer includes a plurality of repeating grating units arranged in an array manner; and a fingerprint sensor, wherein the fingerprint sensor is configured to receive an optical signal transmitted from the optical component, and is configured to convert the optical signal into an electrical signal.

In the electronic device provided by the present disclosure, the repeating grating units include a first sub-grating unit disposed at a center and a plurality of second sub-grating units surrounding the first sub-grating unit, an interval between centers of two adjacent first sub-grating units arranged along a first direction is equal to an interval between centers of two adjacent first sub-grating units arranged along a second direction.

In the electronic device provided by the present disclosure, the repeating grating units have a symmetrical shape.

In the electronic device provided by the present disclosure, the optical component further includes at least one of a buffer layer or an optically functional film layer.

In the electronic device provided by the present disclosure, the optically functional film layer is made of at least two different inorganic materials in a stacked manner.

In the electronic device provided by the present disclosure, the optically functional film layer further includes a grating metal layer disposed on the grating dielectric layer.

In the electronic device provided by the present disclosure, the fingerprint sensor includes a first surface and a second surface, and the optical component is attached to the second surface or is disposed inside the fingerprint sensor.

In the electronic device provided by the present disclosure, the optical component is attached to the second surface by an adhesive layer.

In the electronic device provided by the present disclosure, a thickness of the optical component is less than 5 μm.

Compared with conventional technologies, the present disclosure has following beneficial effects: an embodiment of the present disclosure provides an electronic device and an optical fingerprint recognition module thereof. In the optical fingerprint recognition module, a plurality of repeating grating units are disposed on a substrate in an array manner, thereby forming an optical component. On one hand, a thickness of the optical fingerprint recognition module provided by an embodiment of the present disclosure is relatively lesser, which effectively reduces a thickness of the electronic device. On the other hand, the repeating grating units disposed on the optical component have a symmetrical shape and are disposed regularly, so that they can exert their effects whether light is polarized at 0 degrees or 90 degrees, which significantly reduces influence due to different polarization directions of light reflected by a fingerprint.

In addition, the optical component provided by the embodiment of the present disclosure further includes an optically functional film layer with a property of filters. The optically functional film layer can selectively allow one or more of red light, green light, and blue light to pass through it, and can reduce transmittance of incident light from wide angles. Combined with a grating dielectric layer, a signal-to-noise ratio of a fingerprint recognition can be further increased.

Finally, the optical fingerprint recognition sensor provided by the embodiment of the present disclosure can be used in not only LCD devices, but also OLED display devices.

DETAILED DESCRIPTION

Figure 1:
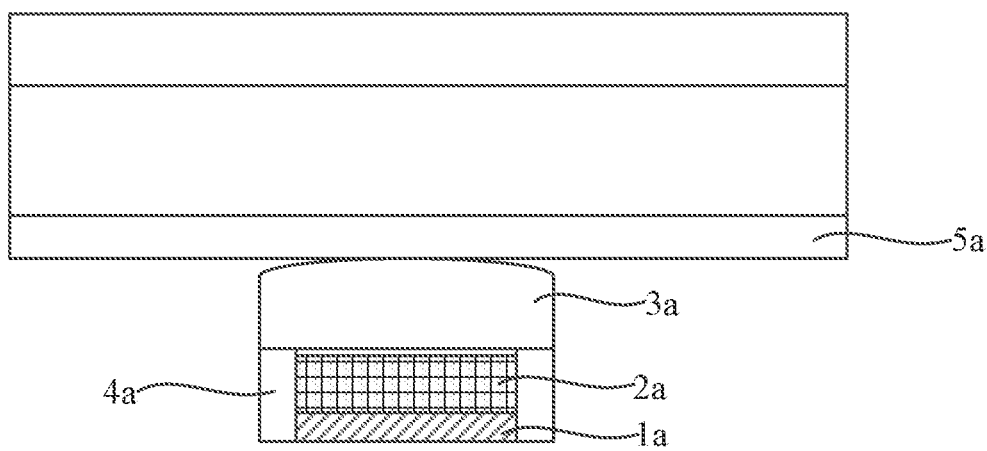
FIG. 1 is a schematic structural view showing a conventional electronic device.

Embodiments are further described below in detail with reference to accompanying drawings to make objectives, technical solutions, and advantages of the present disclosure clearer and more precise. Examples of the described embodiments are given in the accompanying drawings, wherein the identical or similar reference numerals constantly denote the identical or similar elements or elements having the identical or similar functions. The specific embodiments described with reference to the attached drawings are all exemplary and are intended to illustrate and interpret the present disclosure, which shall not be construed as causing limitations to the present disclosure. A wording "embodiment" used in the present disclosure means an example or a demonstration.

In the description of the present disclosure, it should be understood that terms such as "center", "longitudinal", "lateral", "length", "width", "thickness", "upper", "lower", "front", "rear", "left", "right", "vertical", "horizontal", "top", "bottom", "inside", "outside", "clockwise", "counterclockwise", as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

In the description of the present disclosure, it should be noted that unless there are express rules and limitations, the terms such as "mount," "connect," and "bond" should be comprehended in broad sense. For example, it can mean a permanent connection, a detachable connection, or an integrated connection; it can mean a mechanical connection, an electrical connection, or a direct connection; it can also mean an indirect connection by an intermediate, or an inner communication between two elements. A person skilled in the art should understand the specific meanings in the present disclosure according to specific situations.

Figure 2:
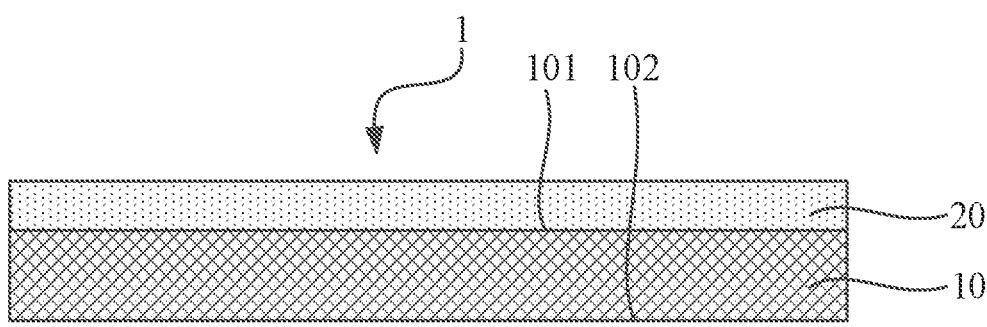
FIG. 2 to FIG. 4 are schematic views showing an optical fingerprint recognition module provided by an embodiment of the present disclosure.
Figure 5:
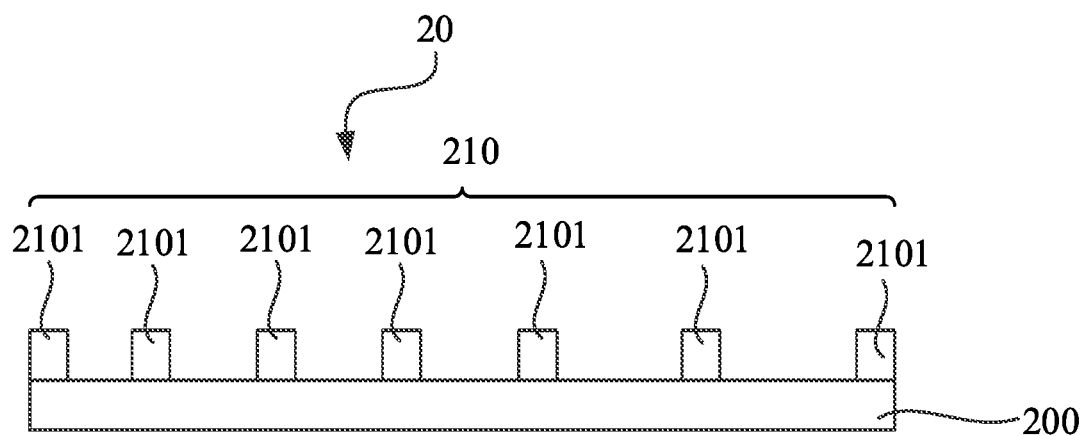
FIG. 5 is a schematic view showing an optical component provided by an embodiment of the present disclosure.

Please refer to FIG. 2 and FIG. 5, an embodiment of the present disclosure provides an optical fingerprint recognition module 1, including an optical component 20 and a fingerprint sensor 10. The optical component 20 includes a substrate 200 and a grating dielectric layer 210 disposed on the substrate 200. The grating dielectric layer 210 includes a plurality of repeating grating units 2101 arranged in an array manner. The fingerprint sensor 10 is configured to receive an optical signal transmitted from the optical component 20, and is configured to convert the optical signal into an electrical signal.

Figure 3:
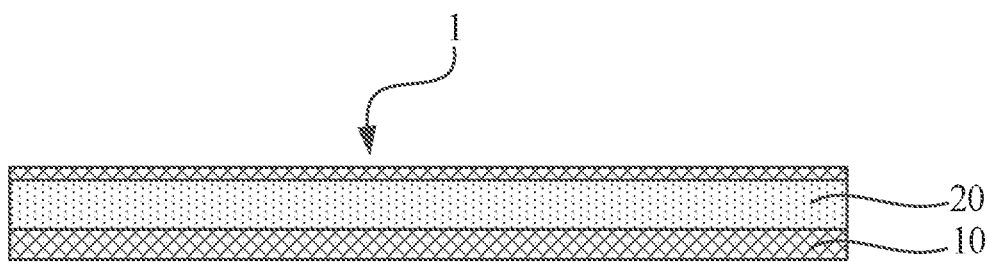
Figure 4:
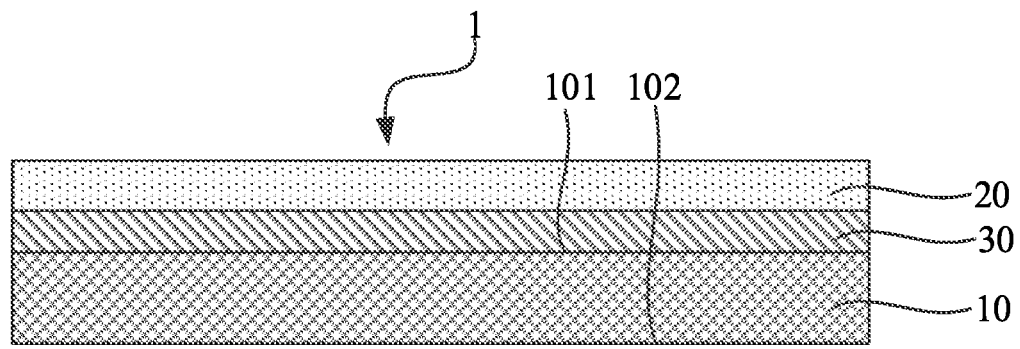

Specifically, as shown in FIG. 2 and FIG. 3. In the present embodiment, the fingerprint sensor 10 includes a first surface 101 and a second surface 102, and the optical component 20 is attached to the second surface 102 or is disposed inside the fingerprint sensor 10. Furthermore, please refer to FIG. 4, the optical component 20 is attached to the second surface 102 by an adhesive layer 30. Specifically, the optical component 20 may be directly formed on the second surface 102 of the fingerprint sensor 10, or may be formed on the second surface 102 during a manufacturing process of the fingerprint sensor 10. A material of the adhesive layer 30 includes a transparent adhesive material. For example, it includes a polyester, such as polyethylene terephthalate and polyethylene naphthalene, a polyolefin, such as acrylic, vinyl chloride, polycarbonate, polystyrene, polyurethane, polyethylene, and polypropylene, or a polymer such as a triacetate cellulose (TAC) film.

Furthermore, please refer to FIG. 5, the optical component 20 includes a substrate 200 and a grating dielectric layer 210 disposed on the substrate 20. The gating dielectric layer 210 includes a plurality of repeating grating units 2101 arranged in an array manner. A thickness of the optical component 20 is less than 5 µm.

The substrate 200 includes a transparent substrate. For example, a material of the substrate 200 includes glass, silicon oxide, silicon nitride, or an organic material such as polyethylene terephthalate (PET), polymethylmethacrylate (PMMA), polycarbonate (PC), polystyrene (PS), and epoxy resin. A material of the grating dielectric layer 210 includes an inorganic material such as silicon, zirconium dioxide, and aluminum oxide.

Figure 6:
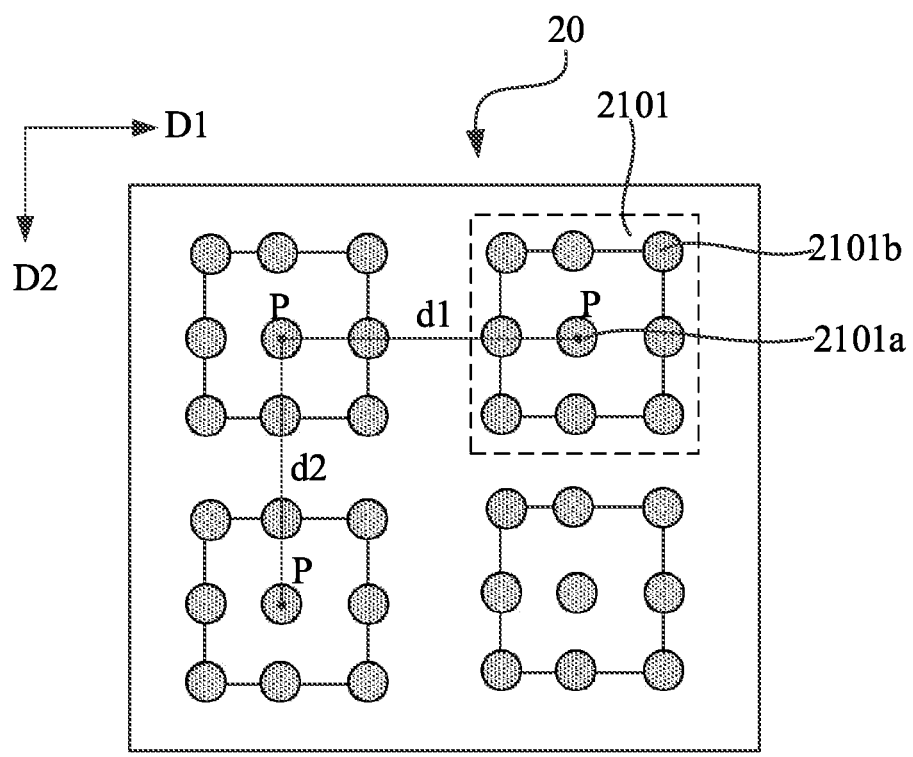
FIG. 6 is a top view showing the optical component provided by the embodiment of the present disclosure.
Figure 7:
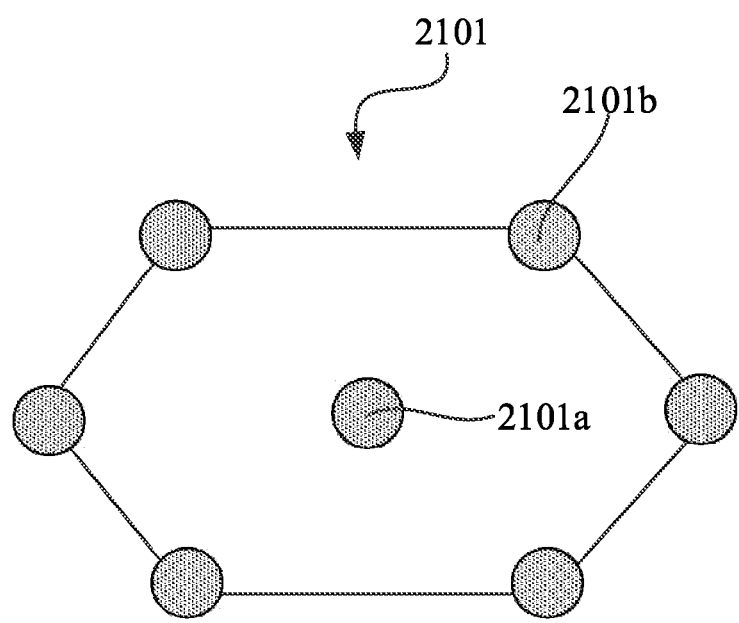
FIG. 7 and FIG. 8 are top views showing repeating grating units of the optical component provided by the embodiment of the present disclosure.
Figure 8:
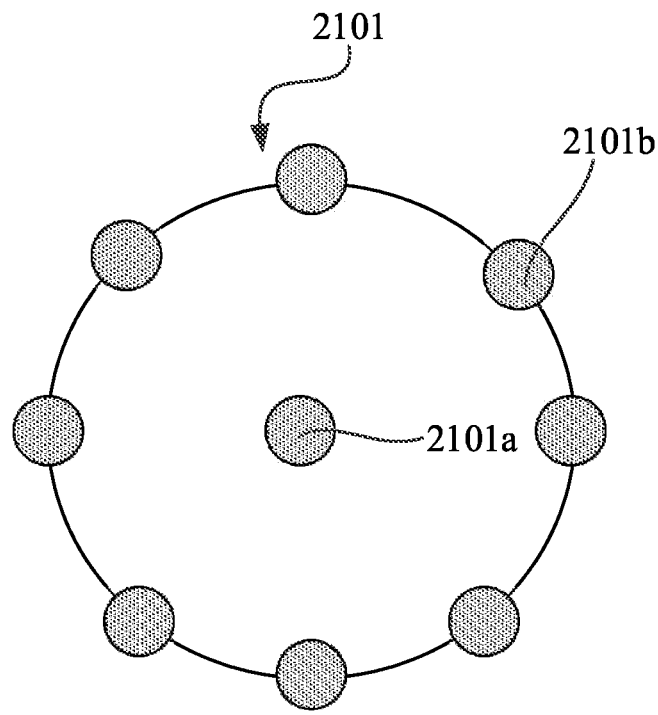

Specifically, please refer to FIG. 6, the repeating grating units 2101 include a first sub-grating unit 2101a disposed at a center and a plurality of second sub-grating units 2101b surrounding the first sub-grating unit 2101a, an interval d1 between centers P of two adjacent first sub-grating units 2101a arranged along a first direction D1 is equal to an interval d2 between centers P of two adjacent first sub-grating units 2010a arranged along a second direction D2. The repeating grating units 2101 have a symmetrical shape. For example, a structure of the repeating grating units 2101 is rectangular. The interval d1 between the centers P of two adjacent first sub-grating units 2101a arranged along the first direction D1 and the interval d2 between the centers P of two adjacent first sub-grating units 2010a arranged along the second direction D2 range from 150 nm to 1000 nm. In the present embodiment, it should be noted that the structure of the repeating grating units 2101 may include other symmetrical shapes. For example, as shown in FIG. 7, the structure of repeating grating units 2101 is hexagonal. As shown in FIG. 8, the structure of the repeating grating units 2101 is circular. In the present embodiment, it should be noted that the structure of the repeating grating units 2101 may also be a rhombus, a parallelogram, or a regular polygon with an even number of edges. It should be noted that a number of the second grating sub-units 2101b is not limited to the present embodiment. In the drawings, only one example is demonstrated. However, the present disclosure may further include other examples. In the present embodiment, the repeating grating units 2101 are symmetrically and regularly arranged, so that the optical fingerprint recognition module can exert its effect whether light is oriented at 0 degrees or 90 degrees, which significantly reduces influence due to different polarization directions of light reflected by a fingerprint.

Selectively, the grating dielectric layer 210 is formed on the substrate 200 by nanoimprint lithography. The grating dielectric layer 210 includes the plurality of repeating grating units 2101. It should be noted that the repeating grating units 2101 include a two-dimensional structure and are arranged on the substrate 200 in an array manner. A thickness of the grating dielectric layer 210 ranges from 50 nm to 200 nm. A working principle of the two-dimensional structure is to make light be split up into a spectrum according to a principle multiple-slit interference.

Figure 9:
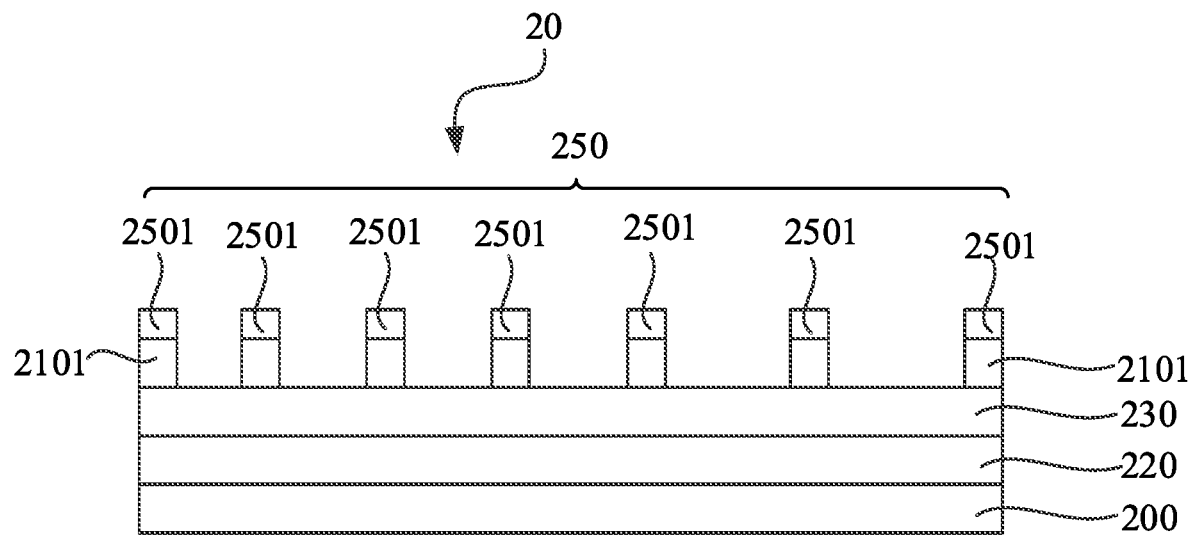
FIG. 9 is a schematic view showing the optical component provided by the embodiment of the present disclosure.

Selectively, as shown in FIG. 9, in the present embodiment, the optical component 20 further includes at least one of a buffer layer 220 or an optically functional film layer 230. It should be understood that the optical component 20 includes three types. A first type: the optical component 20 includes the substrate 200, the buffer layer 220, and the grating dielectric layer 210, wherein the buffer layer 220 is disposed on the substrate 200, and the grating dielectric layer 210 is disposed on the buffer layer 220. A second type: the optical component 20 includes the substrate 200, the optically functional film layer 230, and the grating dielectric layer 210, wherein the optically functional film layer 230 is disposed on the substrate 200, and the grating dielectric layer 210 is disposed on the optically functional film layer 230. A third type: the optical component 20 includes the substrate 200, the buffer layer 220, the optically functional film layer 230, and the grating dielectric layer 210, wherein the buffer layer 220 is disposed on the substrate 200, the optically functional film layer 230 is disposed on the buffer layer 220, and the grating dielectric layer 210 is disposed on the optically functional film layer 230. Alternatively, the optically functional film layer 230 is disposed on the substrate 200, the buffer layer 220 is disposed on the optically functional film layer 230, and the grating dielectric layer 210 is disposed on the buffer layer 220. Furthermore, the optically functional film layer 230 is made of at least two different inorganic materials in a stacked manner. For example, the optically functional film layer 230 is made of at least two coating materials selected from $SiO_2$, ZnS, $ZrO_2$, $Ta_2O_5$, $Nb_2O_5$, $TiO_2$, $Al_2O_3$, ITO, and $MgF_2$, in a stacked manner. The optical component 20 provided by the embodiment of the present disclosure further includes the optically functional film layer 230 with a property of filters. The optically functional film layer 230 can selectively allow one or more of red light, green light, and blue light to pass through it, and can reduce transmittance of incident light from wide angles. Combined with a grating dielectric layer, a signal-to-noise ratio of a fingerprint recognition can be further increased.

Selectively, please continue to refer to FIG. 9, in the present embodiment, the optical component 20 further includes a grating metal layer 250 disposed on the grating dielectric layer 210. A plurality of grating metal units 2501 of the grating metal layer 250 are disposed on the repeating grating units 2101.

The present embodiment further provides an electronic device, including the optical fingerprint recognition module 1 and a display panel. The optical fingerprint recognition module 1 is disposed on the display panel or is integrated in the display panel. The electronic device includes a liquid crystal display (LCD) or an organic light-emitting diode (OLED). The optical fingerprint recognition module and the LCD or the OLED may be integrated together in the display device. On one hand, a fingerprint recognition function can be achieved. On the other hand, several steps can be completed in a single process, thereby simplifying a manufacturing process.

Figure 10:
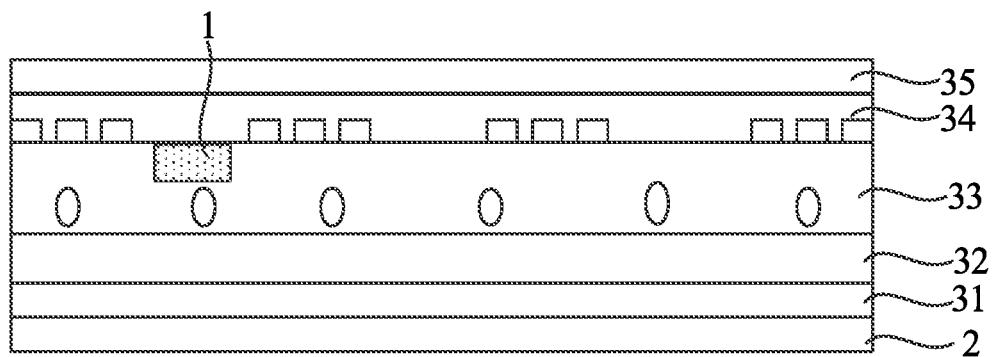
FIG. 10 to FIG. 13 are schematic views showing an electronic device provided by an embodiment of the present disclosure.

As shown in FIG. 10, taking an LCD device as an example. The LCD device includes a backlight module 2 and a liquid crystal cell. The liquid crystal cell includes a first polarizer 31, an array substrate 32, a liquid crystal layer 33, a color filter substrate 34, and a second polarizer 35. The array substrate 32 is stacked on the first polarizer 31, the color filter substrate 34 is stacked on the array substrate 32, the liquid crystal layer 33 is disposed between the color filter substrate 34 and the array substrate 32, and the second polarizer 35 is stacked on the color filter substrate 34. A liquid crystal material of the liquid crystal layer 33 includes polymer dispersed liquid crystals (PDLCs) and polymer network liquid crystals (PNLCs). The optical fingerprint recognition module is disposed on a surface of the liquid crystal layer 33 near the color filter substrate.

Figure 11:
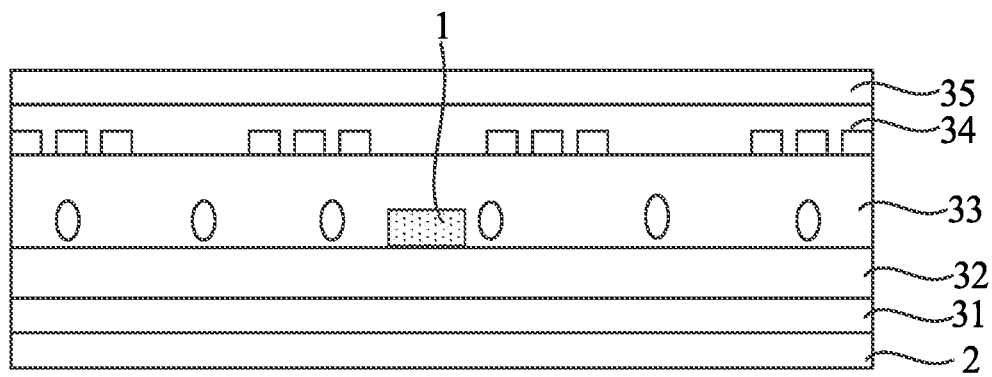

Selectively, as shown in FIG. 11, in the present embodiment, the optical fingerprint recognition module 1 may also be disposed on a surface of the liquid crystal layer 33 near the array substrate 32.

Figure 12:
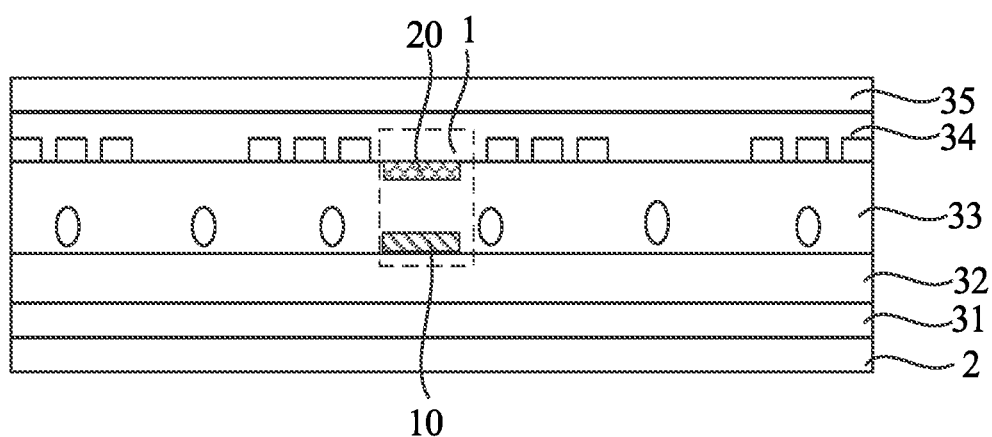

Selectively, as shown in FIG. 12, in the present embodiment, the optical fingerprint recognition module includes the optical component 20 and the fingerprint sensor 10. The fingerprint sensor 10 is disposed on a surface of the liquid crystal layer 33 near the array substrate 32, and the optical component 20 is disposed on a surface of the liquid crystal layer 33 near the color filter substrate 34.

Figure 13:
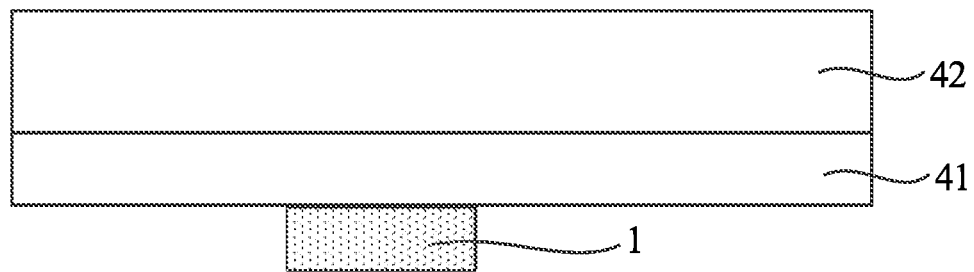

Exemplary, as shown in FIG. 13, when the electronic device is an OLED display device, the display panel includes a thin film transistor (TFT) array substrate 41 and a panel 42. The optical fingerprint recognition module 1 is disposed on a surface of the TFT array substrate 41 away from the panel 42.

Compared with conventional technologies, an embodiment of the present disclosure provides an electronic device and an optical fingerprint recognition module thereof. In the optical fingerprint recognition module, a plurality of repeating grating units are disposed on a substrate in an array manner, thereby forming an optical component. On one hand, a thickness of the optical fingerprint recognition module provided by an embodiment of the present disclosure is relatively lesser, which effectively reduces a thickness of an electronic device. On the other hand, the repeating grating units disposed on the optical component have a symmetrical shape and are disposed regularly, so that they can exert their effects whether light is polarized at 0 degrees or 90 degrees, which significantly reduces influence due to different polarization directions of light reflected by a fingerprint.

In addition, the optical component provided by the embodiment of the present disclosure further includes an optically functional film layer with a property of filters. The optically functional film layer can selectively allow one or more of red light, green light, and blue light to pass through it, and can reduce transmittance of incident light from wide angles. Combined with a grating dielectric layer, a signal-to-noise ratio of a fingerprint recognition can be further increased.

Finally, the optical fingerprint recognition sensor provided by the embodiment of the present disclosure can be used in not only LCD devices but also OLED display devices.

The present disclosure has been described with preferred embodiments thereof. The preferred embodiments are not intended to limit the present disclosure, and it is understood that many changes and modifications to the described embodiment can be carried out without departing from the scope and the spirit of the disclosure that is intended to be limited only by the appended claims.

What is claimed is:

1. An optical fingerprint recognition module, comprising an optical component, wherein the optical component comprises a substrate and a grating dielectric layer disposed on the substrate, and the grating dielectric layer comprises a plurality of repeating grating units arranged in an array manner; and
a fingerprint sensor, wherein the fingerprint sensor is configured to receive an optical signal transmitted from the optical component, and is configured to convert the optical signal into an electrical signal;
wherein the repeating grating units comprise a first sub-grating unit disposed at a center and a plurality of second sub-grating units surrounding the first sub-grating unit, and an interval between centers of two adjacent first sub-grating units arranged along a first direction is equal to an interval between centers of two adjacent first sub-grating units arranged along a second direction.

2. The optical fingerprint recognition module of claim 1, wherein the repeating grating units have a symmetrical shape.

3. The optical fingerprint recognition module of claim 1, wherein the optical component further comprises at least one of a buffer layer or an optically functional film layer.

4. The optical fingerprint recognition module of claim 3, wherein the optically functional film layer is made of at least two different inorganic materials in a stacked manner.

5. The optical fingerprint recognition module of claim 3, wherein the optically functional film layer further comprises a grating metal layer disposed on the grating dielectric layer.

6. The optical fingerprint recognition module of claim 1, wherein the fingerprint sensor comprises a first surface and a second surface, and the optical component is attached to the second surface or is disposed inside the fingerprint sensor.

7. The optical fingerprint recognition module of claim 6, wherein the optical component is attached to the second surface by an adhesive layer.

8. The optical fingerprint recognition module of claim 1, wherein a thickness of the optical component is less than 5μm.

9. An electronic device, comprising an optical fingerprint recognition module and a display panel, wherein the optical fingerprint recognition module is disposed on the display panel or is integrated in the display panel and comprises:
an optical component, wherein the optical component comprises a substrate and a grating dielectric layer disposed on the substrate, and the grating dielectric layer comprises a plurality of repeating grating units arranged in an array manner; and
a fingerprint sensor, wherein the fingerprint sensor is configured to receive an optical signal transmitted from the optical component, and is configured to convert the optical signal into an electrical signal;
wherein the repeating grating units comprise a first sub-grating unit disposed at a center and, a plurality of second sub-grating units surrounding the first sub-grating unit, and an interval between centers of two adjacent first sub-grating units arranged along a first direction is equal to an interval between centers of two adjacent first sub-grating units arranged along a second direction.

10. The electronic device of claim 9, wherein the repeating grating units have a symmetrical shape.

11. The electronic device of claim 10, wherein the optical component further comprises at least one of a buffer layer or an optically functional film layer.

12. The electronic device of claim 11, wherein the optically functional film layer is made of at least two different inorganic materials in a stacked manner.

13. The electronic device of claim 11, wherein the optically functional film layer further comprises a grating metal layer disposed on the grating dielectric layer.

14. The electronic device of claim 9, wherein the fingerprint sensor comprises a first surface and a second surface, and the optical component is attached to the second surface or is disposed inside the fingerprint sensor.

15. The electronic device of claim 14, wherein the optical component is attached to the second surface by an adhesive layer.

16. The electronic device of claim 9, wherein a thickness of the optical component is less than 5μm.

* * * * *